United States Patent
Fabricius et al.

[11] Patent Number: 6,067,388
[45] Date of Patent: May 23, 2000

[54] METHOD OF MAKING AN INTEGRATED OPTICAL COMPONENT AND AN INTEGRATED OPTICAL STAR COUPLER MADE IN ACCORDANCE WITH SAID METHOD

[75] Inventors: Norbert Fabricius, Hockenheim; Wolfgang Foss, Kronau; Martin Wolff, Germersheim; Uwe Hollenbach, Kraichtal; Uwe Seiberth, Oberhausen, all of Germany

[73] Assignee: IOT Integrierte Optik GmbH, Waghäusel, Germany

[21] Appl. No.: 09/352,409

[22] Filed: Jul. 14, 1999

Related U.S. Application Data

[63] Continuation of application No. 08/812,560, Mar. 7, 1997, abandoned.

[30] Foreign Application Priority Data

Mar. 9, 1996 [DE] Germany ............................ 196 09 289

[51] Int. Cl.[7] .............................. G02B 6/12; C03C 15/00
[52] U.S. Cl. .................................. 385/14; 385/37; 385/46; 385/129; 65/30.13; 65/400
[58] Field of Search .................................. 385/14, 15, 31, 385/37, 46, 48, 50, 129, 131, 132; 65/30.1, 30.13, 400

[56] References Cited

U.S. PATENT DOCUMENTS

| | | | |
|---|---|---|---|
| 4,747,654 | 5/1988 | Yi-Yan | 385/37 |
| 4,963,177 | 10/1990 | Najafi et al. | 65/400 |
| 5,151,958 | 9/1992 | Honkanen | 385/141 |
| 5,160,523 | 11/1992 | Honkanen | 65/30.13 |
| 5,412,744 | 5/1995 | Dragone | 385/37 |
| 5,414,548 | 5/1995 | Tachikawa et al. | 385/37 |
| 5,526,453 | 6/1996 | Wolf et al. | 385/42 |
| 5,708,750 | 1/1998 | Kevorkian et al. | 385/129 |

FOREIGN PATENT DOCUMENTS

WO 95/13553  5/1995  WIPO.

OTHER PUBLICATIONS

"Glass waveguide WDM devices: design and analysis" by A. Trevonen, Proceedings of the SPIE, 1996.

"Ion–Exchanged Glass Waveguides: A Review" by R. V. Ramaswamy et al, Journal Of Lightwave Technology, vol. 6, No. 6, Jun. 1988, pp. 984 to 1002.

*Primary Examiner*—Hemang Sanghavi
*Attorney, Agent, or Firm*—Walter Ottesen

[57] ABSTRACT

The invention is directed to a method for making integrated optical components having strip waveguides (11 to 15; 21 to 2M) and a layer waveguide 53. A mask 4 having a lattice structure 3i functions to generate the layer waveguide 53 via ion exchange. The method of the invention is suitable for making couplers having free spaces with low attenuation and is especially suitable for arrayed waveguide grating multiplexers. The invention also is directed to an integrated optical component made pursuant to the method of the invention.

19 Claims, 3 Drawing Sheets

METHOD OF MAKING AN INTEGRATED OPTICAL COMPONENT AND AN INTEGRATED OPTICAL STAR COUPLER MADE IN ACCORDANCE WITH SAID METHOD

This is a continuation of application Ser. No. 08/812,560, filed on Mar. 7, 1997 now abandoned.

FIELD OF THE INVENTION

The invention relates to a method of making an integrated optical component having a layer waveguide and utilizing an ion exchange and a mask having a lattice structure. The invention also relates to an integrated optical star coupler having ion-exchanged strip waveguides and an ion-exchanged free space with which the strip waveguides communicate.

BACKGROUND OF THE INVENTION

Integrated optical components of the kind referred to above are known especially as star couplers in combination with arrayed waveguide gratings, such as for configuring multiplexers and demultiplexers. Examples of such star couplers and a method of making the same are presented in U.S. Pat. Nos. 5,412,744 and 5,414,548.

International Patent Publication WO 95/13553 discloses a method of making integrated optical components having buried waveguides in glass. These components are made utilizing an ion exchange with a mask. This publication also describes the making of a transition between two waveguides which are embedded at different depths. The transition is made utilizing a diagonally cut mask only partially exposing the waveguides.

The mask used reproduces the desired free spaces with an expanded layer waveguide simply as a free space. The problem present utilizing such a mask is that the refractive index profile is deeper in this region than for the narrow strip waveguides which communicate therewith. This is not usable because of the high attenuation.

SUMMARY OF THE INVENTION

It is an object of the invention to provide a method of making an integrated optical component having buried waveguides wherein the path waveguides and a free space coact at low loss. The free space is configured as a layer waveguide. It is also an object of the invention to provide an integrated optical component having buried waveguides.

The method of the invention is for making an integrated optical component in a substrate. The integrated optical component includes a plurality of strip waveguides and a layer waveguide and the method includes the steps of: providing a mask having a lattice structure in the region of the layer waveguide; and, conducting an ion exchange through the lattice structure to the layer waveguide in the substrate.

In another embodiment of the method of the invention, the integrated optical component has a free space configured as a layer waveguide and at least four strip waveguides communicate with the layer waveguide. This embodiment of the method includes the steps of: providing a mask having a plurality of openings formed therein corresponding to the strip waveguides, respectively, and having a strip structure formed therein in the region where the layer waveguide is to be formed; and, conducting an ion exchange through the plurality of openings and the strip structure to form the strip waveguides and the layer waveguide, respectively.

According to a feature of the invention, the integrated optical component is made utilizing an ion exchange with a mask and the mask has a strip or lattice structure in the region of the free space of the component.

According to another feature of the invention, the depth profile of the free space of the integrated optical star coupler is essentially the same as the depth profile of the strip waveguide and is at most greater by a factor of 1.2.

It was recognized that, because of the lateral migration of the ions (which leads to a widening and blurring of path waveguides when compared to the masks), the depth migration for narrow structures is slowed. On the other hand, this widening provides the possibility that structures close to each other fuse together. This last feature is utilized with the lattice mask to produce a uniformly wide structure which is not made deeper.

According to still another feature of the invention, the widths of the mask openings of the strip waveguides are less than 3 micrometers and are preferably 1.5 to 2.1 micrometers. For significantly wider mask openings, the widening effect becomes less and, as a peripheral effect, so does the slowing of the depth migration resulting therefrom. In the free space, the relationships are then no longer so greatly different.

The narrow structures in the given width range are, however, preferred for an excellent integration of the integrated optical components and result in suitable modes for wave guidance.

According to another feature of the invention, a measure of the size of the free space is given. At least a circle having a diameter of more than four times the width (w) of the mask openings fits between the ends of the mask openings of the strip waveguides. In this way, a clear difference is given to an adiabatic 2×2 coupler as approximately shown in U.S. Pat. No. 5,526,453 incorporated by reference. Normally, the circle diameter is by one to three orders of magnitude the width of the mask openings.

According to another feature of the invention, the component can be configured as a multiplexer/demultiplexer unit having an arrayed waveguide grating and having star couplers with free spaces. A specific need for the method of the invention is given hereby.

The strip structure or lattice structure of the mask in the region of the free space has the same or at most 1.5 times the width of the mask openings in the region of the strip waveguides. Preferably, the same width of the mask openings as in the area of strip waveguides is used. This can be easily produced and provides the best adapted ion exchange performance. Deviating widths of the mask openings are, however, also usable. The center spacing of the mask openings amounts to two to approximately eight times the width of the openings. Below this, the difference to the mask having a simple free space is too little. Above this, the lower limit region of the layer waveguide again has a wavy structure with the width of the mask openings being significant. The range of six to seven times is preferable. The direction of the lattice lines is not necessarily aligned to the geometry of the path waveguides which communicate therewith. The targeted use of this direction and the residual waviness in the lower limit region and the lateral edges and the transitions to the strip waveguides however provide possibilities for fine tuning.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
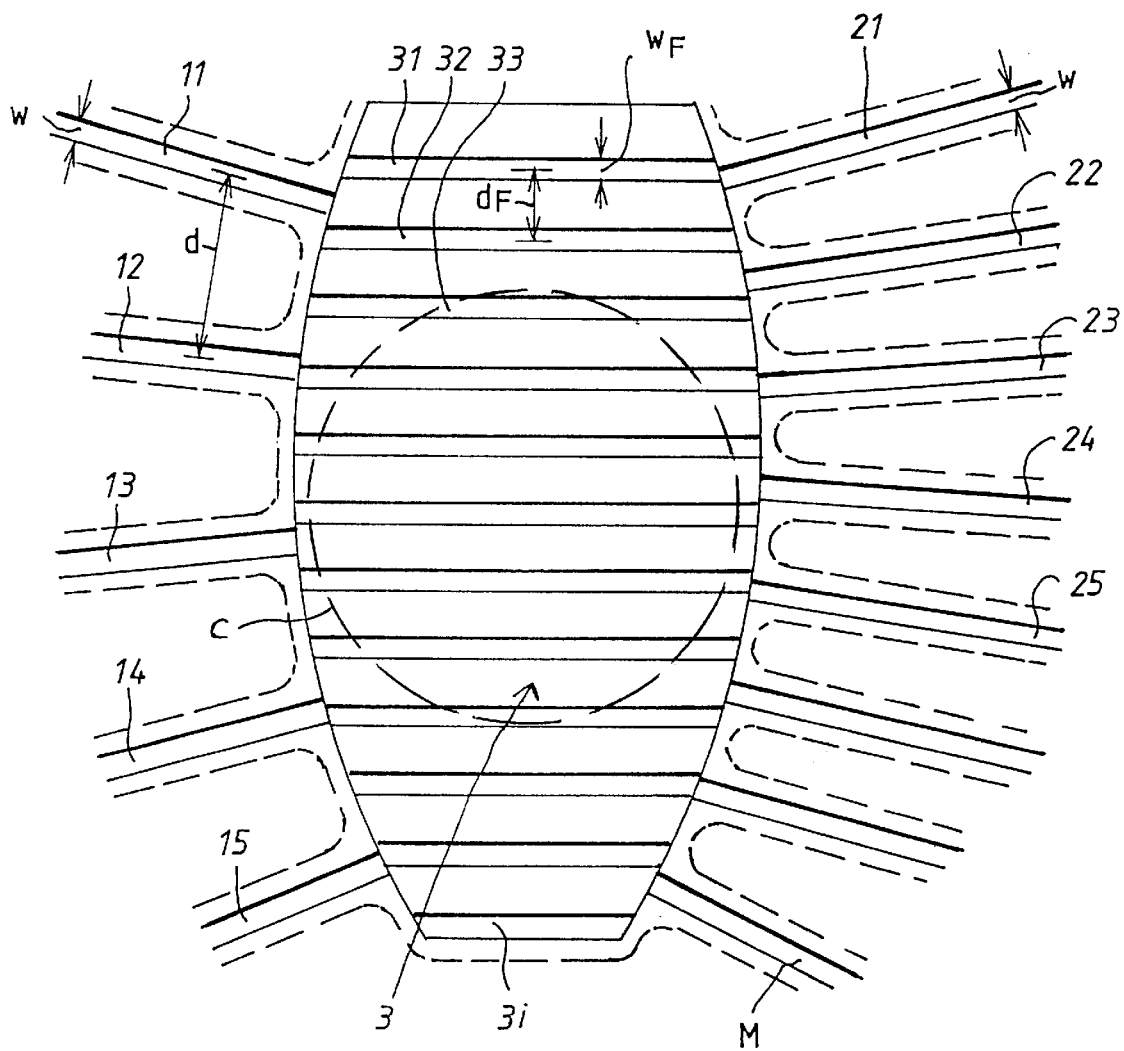
FIG. 1 is a plan view of a mask and waveguide of an N×M star coupler having a free space as provided by the invention.

In FIG. 1, the structure of the mask 4 is shown with solid lines as it is mounted for the ion exchange process on the substrate. The mask includes a vapor deposited and photolithographically structured metal layer (chromium). A qualitative example is presented in order to show the important characteristics. To the left, a number N=5 of input waveguides (11 to 15) are provided. The clear path width w is typically 1.5 to 1.6 $\mu$m.

The output waveguides (21 to 2M) extend outwardly toward the right and, in this embodiment, have the same path width w of the mask. These output waveguides can, for example, be the elements of an arrayed waveguide grating. The spacing of the output waveguides (21 to 2M) typically is d=20 to 25 $\mu$m.

The connection between the input waveguides (11 to 15) and the output waveguides (21 to 2M) is provided by a free space 3 which is formed on the mask as a pattern of parallel strips 31, 32, ..., 3i. The path width $w_F$ of the strips 31 to 3i is equal to the path width w of the input waveguides (11 to 15) and of the output waveguides (21 to 2M). The center spacing d (the period) of the strips 31 to 3i is 8 to 12 $\mu$m for $w_F$=1.5 $\mu$m and is preferably greater than 9 $\mu$m. The center spacing d is five to eight times the path width $w_F$. For a center spacing of 15 $\mu$m, a definitely wavy structure of the generated waveguide refractive index profile is obtained. This structure is then impressed by the individual strips of the mask.

The waveguide structure, which is generated in the glass 5 with this mask utilizing an ion exchange, is shown in broken lines. The waveguides have a continuously varying refractive index profile corresponding to the density of the ions diffused into the glass.

The broken lines represent the largest half-width of the refractive index profile. In the region of the free space, a layer waveguide results because of the center spacing of the strips 31 to 3i. It is therefore easily possible that the strips of the mask are rotated, as desired (for example, by 90°), in the region of the free space 3.

The plurality of mask openings (11 to 15, 21 to 2M), have respective ends at the region of the layer waveguide. At least one circle C has a diameter greater than four times the width (w) and fits between these ends as shown in FIG. 1.

Figure 2A:
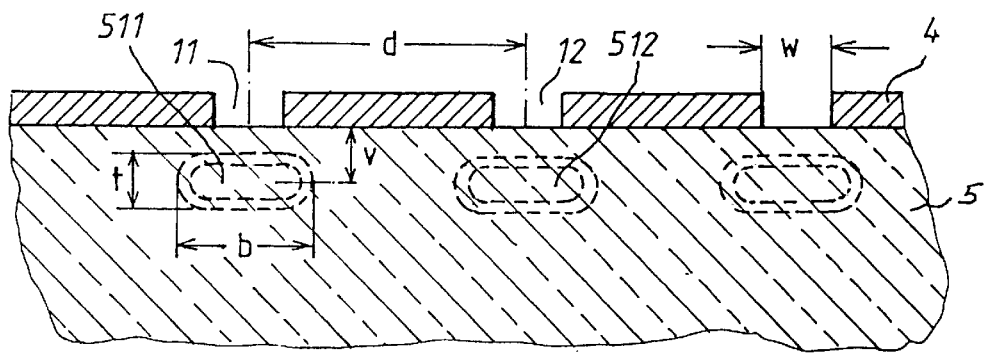
FIG. 2a is a detail section view of the embodiment of FIG. 1 in the region of the input waveguide.
Figure 2B:
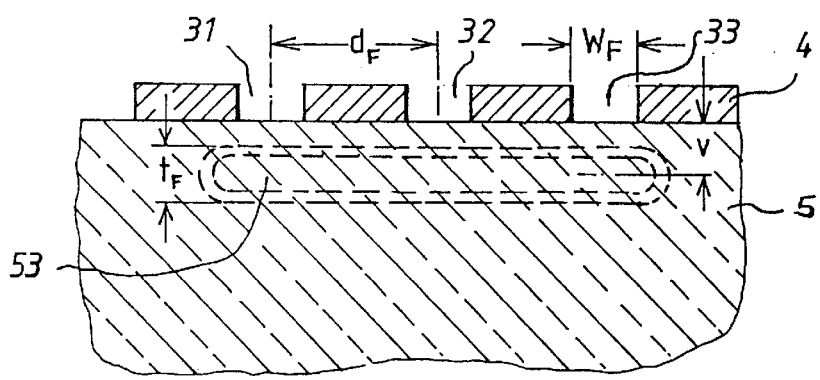
FIG. 2b is a detail cross section of the embodiment of FIG. 1 in the region of the free space.
Figure 2C:
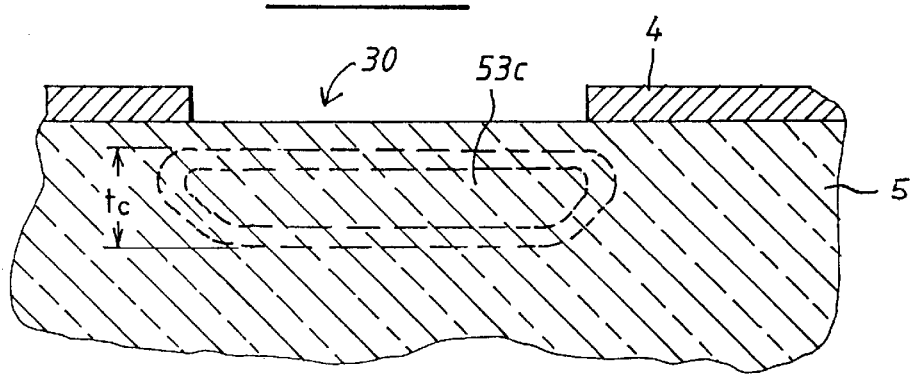
FIG. 2c is the same view as FIG. 2b, but for an unstructured mask in the region of the free space; and, FIG. 3 shows a N×M star coupler having arrayed waveguide gratings and free spaces made pursuant to the method of the invention.

The cross-sectional views presented in FIGS. 2a to 2c make clear the relationship of the mask 4 to the generated waveguide in the glass substrate 5. FIGS. 2a to 2c qualitatively show the situation after a completed ion exchange before the mask 4 is removed.

FIG. 2a shows a cross section in the region of the input waveguides 511 and 512. The mask 4 has clear paths (11, 12) having a width (w). These clear paths correspond to waveguides (511, 512) in the substrate 5. The waveguides are regions of high concentration of the exchanged ions in the substrate. These are shown by broken lines as in FIG. 1.

The center spacing (d) of the paths (11, 12) is large compared to the respective widths (w) of the paths. The waveguides (511, 512) are clearly separated from each other. The waveguides (511, 512) have a width (b) and a depth (t) of approximately b=10 $\mu$m and t=8 $\mu$m. The depth (v) at which the waveguides are buried is approximately v=18 $\mu$m.

FIG. 2b shows the configuration in the region of the free space 3. The strips (31, 32, 33) have the same width $w_F$=w as above but a significantly narrower center spacing $d_F$. The center spacing $d_F$ is only approximately as large as the width (b) of a waveguide (511, 512) shown in FIG. 2a. Accordingly, and for an ion exchange, a uniform layer waveguide 53 is formed in the substrate, which fills out the entire free space 3. The depth $t_F$ of the layer waveguide 53 in relationship to the depth (t) of the individual waveguide is controlled by the center spacing $d_F$ of the strips (31, 32, 33) and can be made equal thereto, that is, $t_F$=t. This is optimal for the low loss coupling from the input waveguide into the free space and then into the output waveguide.

In contrast, FIG. 2c shows the result, which is obtained when, in lieu of the strip mask, which is used according to the invention, a conventional clear space 30 is provided on the mask 4 for the free space 3. A layer waveguide 53c is then generated in the substrate 5 and has a depth profile which exhibits a clearly greater depth $t_C$. In this way, a distinct step with corresponding losses arises at the transitions to the input and output waveguides (11 to 15; 21 to 2M).

Figure 3:
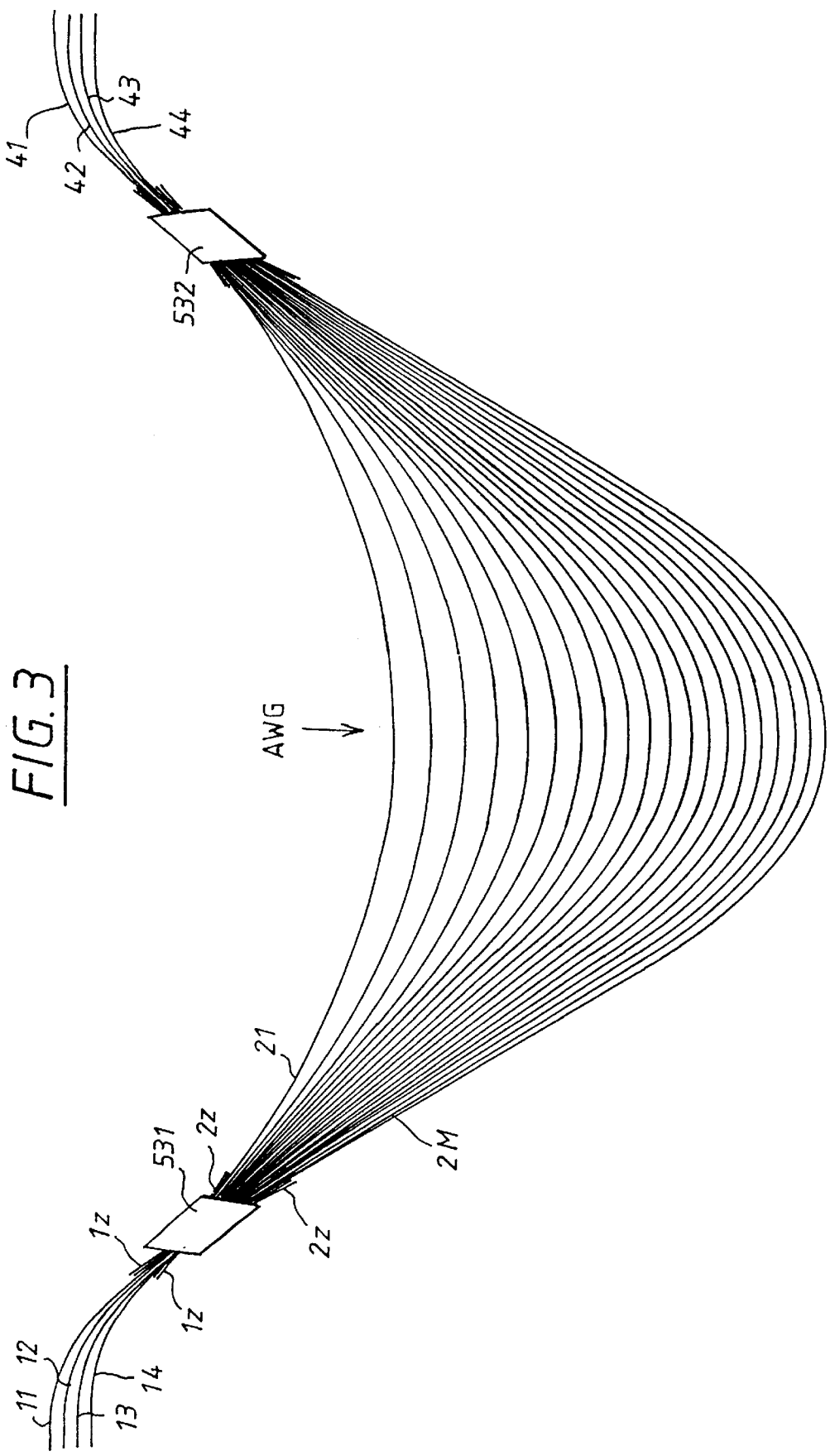

FIG. 3 shows a 4×4 multiplexer having two star couplers with free spaces (531, 532) and arrayed waveguide gratings arranged therebetween. The multiplexer per se is known in principle, for example, from the above-cited U.S. Pat. Nos. 5,412,744 and 5,414,548. What is new here is the above-described method of making the optical component and the characteristic obtained thereby that the layer waveguides have the same depth and thickness in the regions of the free spaces (531, 532) as the input and output waveguides (11 to 14, 21–2M and 41 to 44).

In FIG. 3, additional truncated waveguides 1z and 2z are arranged, respectively, next to waveguides (11 to 14) and waveguides (21 to 2M). These truncated waveguides serve to avoid peripheral effects at the respective outermost waveguides (11, 14 and 21, 2M). The waveguides are shown spread in the transverse direction.

Design data for a multiplexer is presented in Table 9.

It is understood that the foregoing description is that of the preferred embodiments of the invention and that various changes and modifications may be made thereto without departing from the spirit and scope of the invention as defined in the appended claims.

TABLE 1

Design Data for a Multiplexer

| | |
|---|---|
| Number of inputs | (11 to 14) |
| Number of outputs | (41 to 44)* |
| Number of arrayed waveguides (21 to 2M) of the grating | (10)** |
| Mask path width for the above | w = 1.5 to 1.6 $\mu$m |
| Width of the individual waveguides | b ≈ 10 $\mu$m |
| Depth of the individual waveguides | t ≈ 8 $\mu$m |
| Depth at which individual waveguides are embedded | v ≈ 18 $\mu$m |

TABLE 1-continued

Design Data for a Multiplexer

| | |
|---|---|
| Radius of the free space zone | 2370.2 μm |
| Center spacing for strips of the mask for the free space | $d_F$ = 9 μm |
| Depth of the free space zone | $t_F$ ≈ 8 μm |
| Length difference of adjacent arrayed waveguides | 127.4 μm |
| Center wave length λ0 | 1.552 μm |
| Channel Spacing | 3.2 nm |

*four outputs for each input
**twenty would be preferable

What is claimed is:

1. A method for making an integrated optical component in a substrate, the integrated optical component including a plurality of strip waveguides and a layer waveguide, the method comprising the steps of:
providing a mask having a lattice structure in the region of said layer waveguide; and,
conducting an ion exchange through said lattice structure to form said layer waveguide as a uniform layer waveguide in said substrate.

2. The method of claim 1, wherein said substrate is glass.

3. The method of claim 1, wherein said mask has a plurality of openings corresponding to respective ones of said strip waveguides and each of said openings having a width (w) of less than 3 μm.

4. The method of claim 3, wherein said width (w) lies in the range of 1.5 to 2.1 μm.

5. The method of claim 3, wherein the method comprises the further step of configuring said integrated optical component as a multiplexer/demultiplexer having arrayed waveguide gratings and star couplers having free spaces.

6. A method for making an integrated optical component in a substrate, the integrated optical component including a plurality of strip waveguides and a layer waveguide, the method comprising the steps of:
providing a mask having a lattice structure in the region of said layer waveguide;
conducting an ion exchange through said lattice structure to form said layer waveguide in said substrate;
said mask having a plurality of openings corresponding to respective ones of said strip waveguides and each of said openings having a width (w) of less than 3 μm;
said plurality of openings in said mask having respective ends at said region of said layer waveguide; and,
a circle having a diameter greater than four times said width (w) between said ends.

7. A method for making an integrated optical component in a substrate, the integrated optical component including a plurality of strip waveguides and a layer waveguide, the method comprising the steps of:
providing a mask having a lattice structure in the region of said layer waveguide;
conducting an ion exchange through said lattice structure to form said layer waveguide in said substrate;
said mask having a plurality of openings corresponding to respective ones of said strip waveguides and each of said openings having a width (w) of less than 3 μm; and,
said lattice structure of said mask having lattice openings ($w_F$) lying in the range of 1 to 1.5 times said width (w) of said openings of said mask corresponding to said strip openings.

8. The method of claim 7, said lattice openings having a center spacing ($d_F$) lying in the range of 2 to 8 times said width (w) of said openings corresponding to said strip waveguides.

9. The method of claim 7, said lattice openings having a center spacing ($d_F$) lying in the range of 6 to 7 times said width (w) of said openings corresponding to said strip waveguides.

10. A method for making an integrated optical component in a substrate, the integrated optical component having a free space configured as a layer waveguide and at least four strip waveguides communicating with said layer waveguide, the method comprising the steps of:
providing a mask having a plurality of openings formed therein corresponding to said strip waveguides, respectively, and having a strip structure formed therein in the region where said layer waveguide is to be formed; and,
conducting an ion exchange through said openings and said strip structure to form said strip waveguides and said layer waveguide as a uniform layer waveguide, respectively.

11. The method of claim 10, wherein said substrate is glass.

12. The method of claim 10, wherein said mask has a plurality of openings corresponding to respective ones of said strip waveguides and each of said openings having a width (w) of less than 3 μm.

13. The method of claim 12, wherein said width (w) lies in the range of 1.5 to 2.1 μm.

14. The method of claim 12, wherein the method comprises the further step of configuring said integrated optical component as a multiplexer/demultiplexer having arrayed waveguide gratings and star couplers having free spaces.

15. A method for making an integrated optical component in a substrate, the integrated optical component having a free space configured as a layer waveguide and at least four strip waveguides communicating with said layer waveguide, the method comprising the steps of:
providing a mask having a plurality of openings formed therein corresponding to said strip waveguides, respectively, and having a strip structure formed therein in the region where said layer waveguide is to be formed;
conducting an ion exchange through said openings and said strip structure to form said strip waveguides and said layer waveguide, respectively;
said mask having a plurality of openings corresponding to respective ones of said strip waveguides and each of said openings having a width (w) of less than 3 μm;
said plurality of openings in said mask having respective ends at said region of said layer waveguide; and,
a circle having a diameter greater than four times said width (w) between said ends.

16. A method for making an integrated optical component in a substrate, the integrated optical component having a free space configured as a layer waveguide and at least four strip waveguides communicating with said layer waveguide, the method comprising the steps of:
providing a mask having a plurality of openings formed therein corresponding to said strip waveguides, respectively, and having a strip structure formed therein in the region where said layer waveguide is to be formed;
conducting an ion exchange through said openings and said strip structure to form said strip waveguides and said layer waveguide, respectively;

said mask having a plurality of openings corresponding to respective ones of said strip waveguides and each of said openings having a width (w) of less than 3 $\mu$m; and, said strip structure of said mask having lattice openings ($w_F$) lying in the range of 1 to 1.5 times said width (w) of said openings of said mask corresponding to said strip openings.

17. The method of claim 16, said strip structure having a center spacing ($d_F$) lying in the range of 2 to 8 times said width (w) of said openings corresponding to said strip waveguides.

18. The method of claim 16, said strip structure having a center spacing ($d_F$) lying in the range of 6 to 7 times said width (w) of said openings corresponding to said strip waveguides.

19. An integrated optical component comprising:

a substrate having a top surface;

an ion-exchanged free space formed in said substrate;

a plurality of ion-exchanged strip waveguides formed in said substrate to communicate with said free space;

said free space being extended lengthwise in a plane parallel to said top surface;

said free space being greater in every direction parallel to said top surface by one to three orders of magnitude greater than the width of the widest strip waveguide; and, said free space having a depth profile 1 to 1.2 times the depth profile of said strip waveguide.

* * * * *

UNITED STATES PATENT AND TRADEMARK OFFICE
CERTIFICATE OF CORRECTION

PATENT NO. : 6,067,388   Page 1 of 1
DATED : May 23, 2000
INVENTOR(S) : Norbert Hauser, Wolfgang Foss, Martin Wolff, Uwe Hollenbach and Uwe Seiberth It is certified that error appears in the above-identified patent and that said Letters Patent is hereby corrected as shown below:

Column 2,
Line 37, between "is" and "by", insert -- greater -- and between "magnitude" and "the", insert -- than --.

Signed and Sealed this

Eighth Day of January, 2002

Attest:

Attesting Officer

JAMES E. ROGAN
Director of the United States Patent and Trademark Office